F. G. KOEHLER.
SHOCK ABSORBER FOR VEHICLES.
APPLICATION FILED MAY 7, 1908.
944,446.
Patented Dec. 28, 1909.
2 SHEETS—SHEET 1.
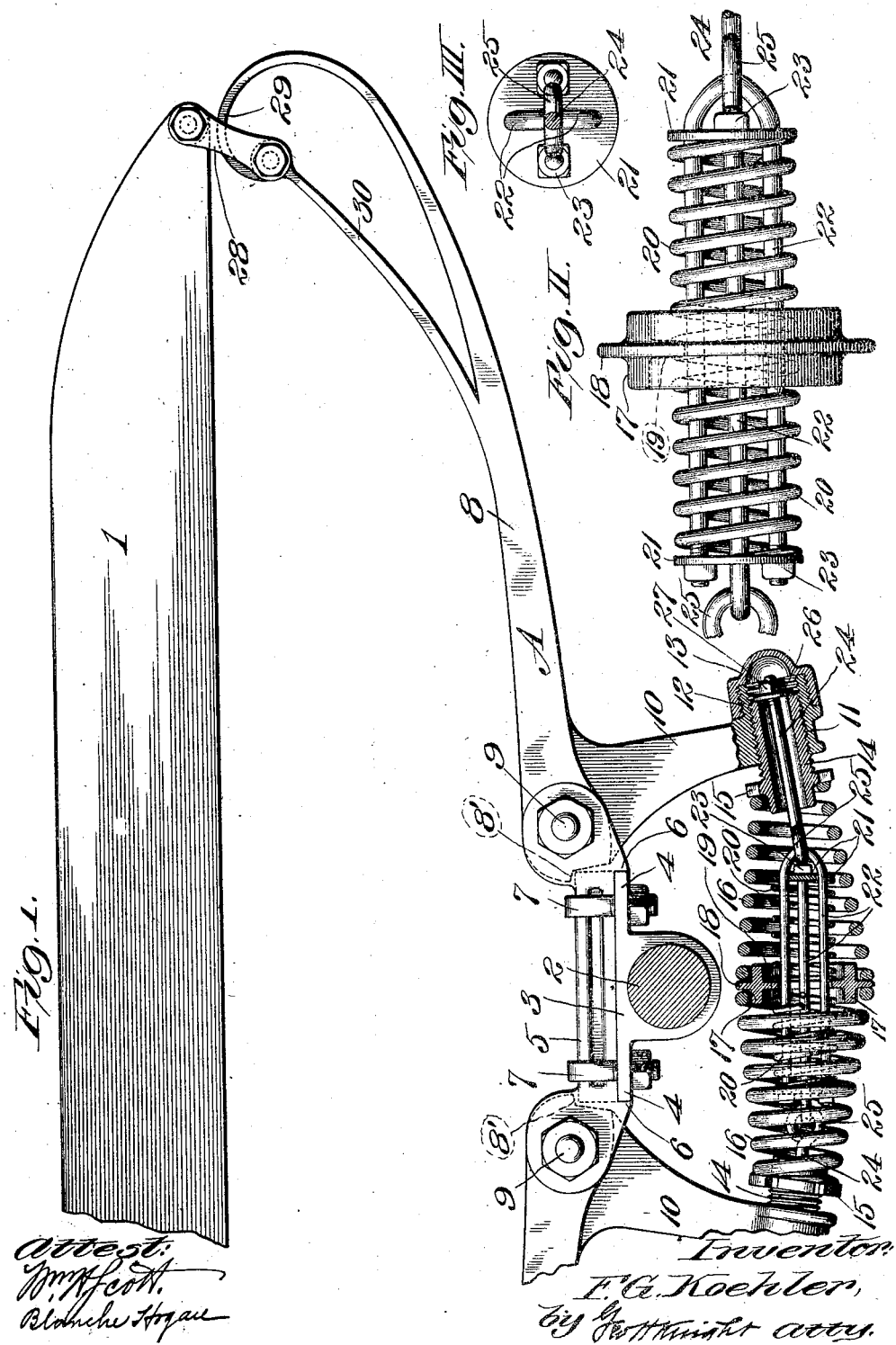

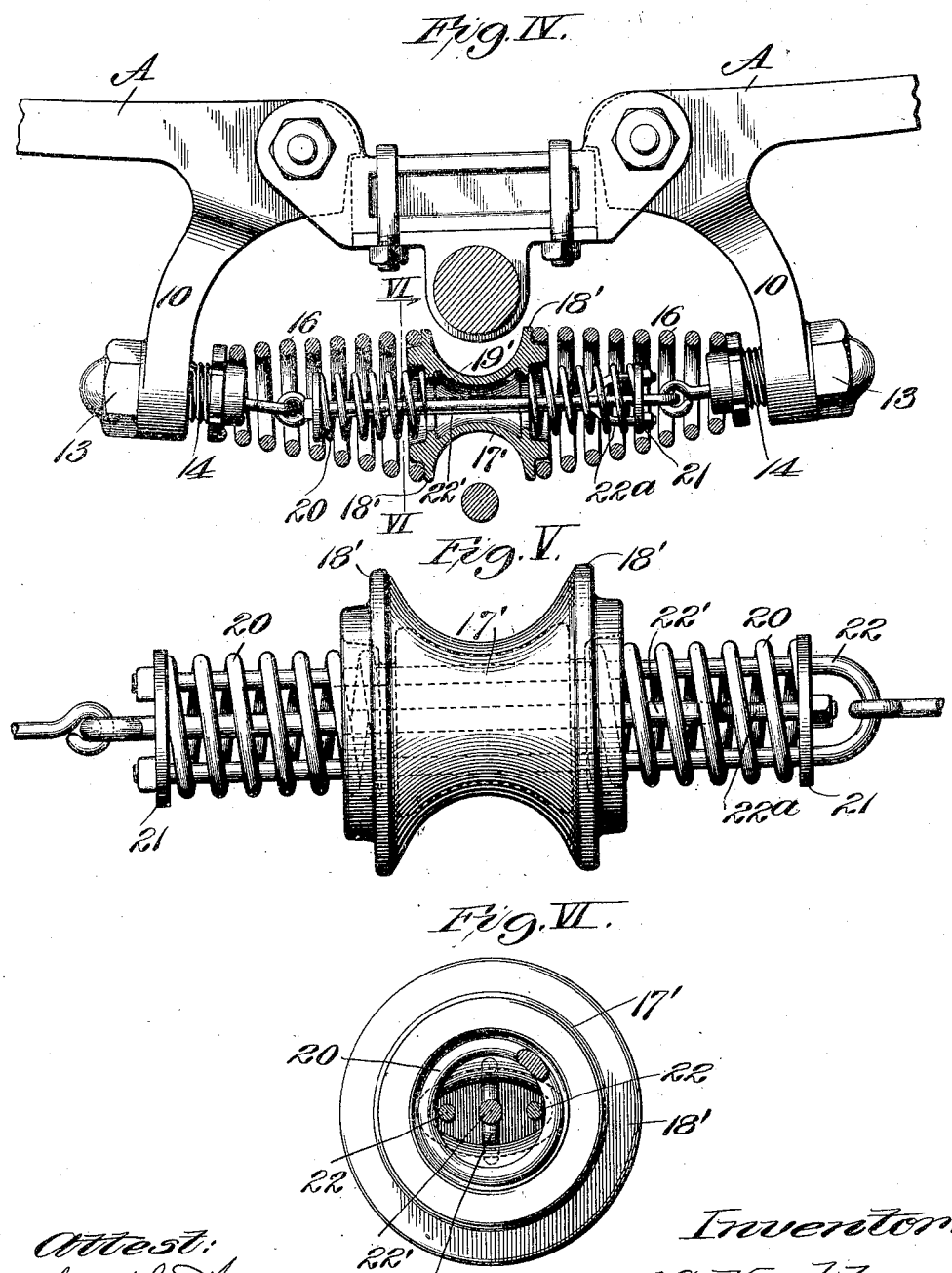

UNITED STATES PATENT OFFICE.

FRANK G. KOEHLER, OF ST. LOUIS, MISSOURI.

SHOCK-ABSORBER FOR VEHICLES.

944,446.   Specification of Letters Patent.   Patented Dec. 28, 1909.

Application filed May 7, 1908. Serial No. 431,344.

*To all whom it may concern:*

Be it known that I, FRANK G. KOEHLER, a citizen of the United States of America, residing at the city of St. Louis, in the State of Missouri, have invented certain new and useful Improvements in Shock-Absorbers for Vehicles, of which the following is a full, clear, and exact description, reference being had to the accompanying drawings, forming part of this specification.

My invention relates to that character of shock absorbers for vehicles that serves to yieldingly resist both the downward movement and rebound of vehicle bodies in order that the degrees of shock to the vehicle bodies may be minimized.

Figure I is part a side elevation and in part a vertical section of one of my springs. Fig. II is a top or plan view of the take-up springs of my shock absorber and the parts immediately associated with said take-up springs. Fig. III is an end view of parts shown in Fig. II with the central spring seat ring omitted. Fig. IV is a view partly in elevation and partly in vertical section of a modification. Fig. V is an enlarged top or plan view of the take-up spring shown in Fig. IV, and the parts immediately associated with said take-up springs. Fig. VI is a vertical cross section taken on line VI—VI, Fig. IV.

In the accompanying drawings: 1 designates a fragment of the body frame of a vehicle and 2 one of the vehicle axles. The vehicle axle has fixed thereto or formed integral with it a ledge member 3 provided with laterally projecting side ledges 4.

5 is a bracket mounted on the ledge member and secured thereto by suitable means such as shackles 7 that are fitted over the bracket and extend through the ledges 4. The bracket 5 is provided at its lower side with shoulders 6 that are adapted to bear against the outer edges of the ledges 4 and thereby serve to prevent longitudinal movement of said brackets.

A designates bearers of bell crank shape and which comprise outer arms 8 and inner arms 10. These bearers are connected to the ends of the bracket 5 by pivot bolts 9 and the upward movement of the bearers is restricted by shoulders 8', see dotted lines Fig. I, which are adapted to move into contact with the upper surfaces of the bracket 5. In the arms 10 of the bearers are screw threaded apertures 11 that are closed at their outer ends by caps 13 which are fitted to necks 12 that protrude from the rear faces of the arms 10.

14 are spring seat screws adjustably mounted in the apertures 11 of the arms 10. These spring seat screws are of hollow form and each screw is provided at its forward end with a spring seat rim 15 so shaped as to readily receive a spanner or wrench by which the screw may be turned to adjust it in the arm 10.

16 are main springs interposed between the arms 10 of the two bearers 8 and the outer ends of which are adapted to rest against the spring seat rims 15 of the screws 14. These springs are preferably of conical shape and when made of this shape the springs are so positioned that their smaller ends are outermost and oppose said spring seat rims.

17 is a central spring seat ring. This spring seat ring has an outer spring seat rib 18 which receives the inner ends of the main spring 16 and serves as a parting member between these springs. At the interior of the ring 17 is a spring seat rib 19.

20 are take-up springs located within the main spring 16 and the inner ends of which rest against the inner rib 19 of the spring seat ring 17. The outer ends of these take-up springs rest against spring seat plates 21.

22 are draw rods that extend longitudinally through the take-up springs. These draw rods are preferably of U-shape and each rod is equipped at one end with nuts 23 that serve to confine one of the spring seat plates 21 upon the rod while the rod has mounted upon it at the opposite end the other spring seat plate 21 that is adapted to move longitudinally upon the rod when the two rods are subjected to strain and the take-up springs are compressed by the forward movement of the spring seat plates.

24 are connecting rods that are provided at their inner ends with eyes 25 that are fitted to the draw rods 22. These connecting rods extend longitudinally through the spring seat screws 14 and they are held from longitudinal movement by washers 26 surrounding the rods and bearing against the outer ends of the spring seat screws, the washers being retained upon the rods by nuts 27.

The outer arms 8 of the bearers A are connected to the vehicle body frame 1 by links 28. Each of these outer arms has incorporated therein a curled spring portion 29 at the termination of the arm and a resistance member 30 that extends from a point intermediate of the ends of the arm 8 to the termination of said curled spring portion and the point at which the links 28 are connected to the bearer arm.

The operation of my shock absorber is as follows: When a ground wheel of a vehicle in which my shock absorber is present is subjected to a shock, the force of such shock is transmitted first as usual to the vehicle axle. The force of the shock is then transmitted from the axle to the bearers A and from said bearers is delivered to the main springs 16 which are opposed at their outer ends by the spring seat screws 14 in the arms 10 and at their inner ends by the spring seat ring 17. Then, upon the rebound of the bearers the take-up springs 20 are brought into action due to the occurrence of pulling strains upon the connecting rods 24 by the bearer arms 10, whereby the draw bars 22 are caused to move the outer spring seat plates 21 in opposite directions and compress the take-up springs between said spring seat plates and the inner rib 19 of the central spring seat ring 17. It is apparent that the spring seat screws 14 may be adjusted inwardly or outwardly in the bearer arms 10 as may be desired to increase or diminish the tension in the main spring 16.

The curled spring portions at the outer ends of the bearer arms 8 are of material merit in my shock absorber in that they serve as additional springs when the bearers are subjected to stress and the resistance members 30 serve in conjunction with the curled spring portions to restrain the inward movements of said portions in order that they may be caused to move in arcs of circles.

In Figs. IV to VI inclusive, I have shown a modification in which all of the parts of the shock absorber, with the exception of the central spring seat ring and the draw rods associated with the take-up springs, are made similar to those in the first described construction. In this modification the central spring seat ring 17' is elongated to provide a groove therein to accommodate the vehicle axle and a truss rod beneath it when such parts are in close proximity in a vehicle to which my shock absorber is applied. The spring seat ring 17' is provided with two external spring seat ribs 18' to receive the inner ends of the main springs 16 and two internal spring seat ribs 19' to receive the inner ends of the take-up springs 20. In the modified construction one of the draw bars 22 is made of U-shape while the other draw bar 22' is in the main in the shape of a straight rod and is provided at one end externally of the central spring seat ring with a fork 22ª by which the rod is connected to one of the outer spring seat plates 21.

In conclusion I desire to direct particular notice to the fact that the take-up springs in my shock absorber are located within the main springs and that therefore the entire number of springs is arranged in compact form and occupy a minimum amount of space. This is highly desirable, especially in motor vehicles in which there are numerous parts beneath the bodies of the vehicles including, for instance, steering rods, and if the shock absorber springs are not compactly arranged there is interference between them and the adjacent parts of the vehicle.

I claim:—

1. In a shock absorber for vehicles, a pair of pivotally mounted bearers provided with arms, a spring element interposed between said arms, a take-up spring within said spring element, and means having connection with said arms controlled by said take-up spring, substantially as set forth.

2. In a shock absorber for vehicles, a pair of pivotally mounted bearers provided with arms, a pair of main springs interposed between said arms, a pair of take-up springs within said main springs, a spring seat member interposed between the main springs and take-up springs, and means having connection with said arms controlled by said take-up springs, substantially as set forth.

3. In a shock absorber for vehicles, a pair of pivotally mounted bearers provided with arms, a spring element interposed between said arms, adjustable spring seat members mounted in said arms and serving as resistance members for said spring element, a take-up spring within said spring element, and means having connection with said arms controlled by said take-up spring, substantially as set forth.

4. In a shock absorber for vehicles, a pair of pivotally mounted bearers provided with arms, spring seat members adjustably mounted in said arms, a pair of main springs interposed between said arms and seated at their outer ends against said spring seat members, a spring seat member interposed between said main springs, a pair of take-up springs within said main springs bearing at their inner ends against said central spring seat member, and means having connection with said arms controlled by said take-up springs, substantially as set forth.

5. In a shock absorber for vehicles, a pair of pivotally mounted bearers provided with arms, a pair of main springs interposed between said arms, a central spring seat ring interposed between said main springs and provided with an external rib to receive the inner ends of said main springs, and with an internal rib, a pair of take-up springs within said main springs resting against the inner rib of said central ring, and means having connection with said arms controlled by said take-up springs, substantially as set forth.

6. In a shock absorber for vehicles, a pair of pivotally mounted bearers provided with arms, a pair of main springs interposed between said arms, a central spring seat ring interposed between said main springs, a pair of take-up springs within said main springs and resting at their inner ends against said central spring seat ring, outer spring seat members at the outer ends of said take-up springs, draw rods each loosely mounted in one of said outer spring seat members and connected to the other outer spring seat member, and connecting rods fitted to said draw rods and having connection with said bearer arms, substantially as set forth.

7. In a shock absorber for vehicles, a pair of pivotally mounted bearers provided with arms, a pair of main springs interposed between said arms, spring seat members adjustably mounted in said arms and by which the movements of said main springs are controlled, take-up springs within said main springs, and means controlled by said take-up springs fitted to said spring seat members, substantially as set forth.

8. In a shock absorber for vehicles, a pair of pivotally mounted bearers provided with arms, a pair of main springs interposed between said arms, a pair of take-up springs within said main springs, a central spring seat member interposed between said main springs and take-up springs, spring seat members adjustably mounted in said bearer arms, draw members with which said take-up springs are associated and which include outer spring seat members for said take-up springs, and connecting rods attached to said draw members and having engagement at their outer ends with said adjustable spring seat members, substantially as set forth.

FRANK G. KOEHLER.

In presence of—
BLANCHE HOGAN,
H. G. COOK.